United States Patent
Vanderwees

(10) Patent No.: US 8,992,850 B2
(45) Date of Patent: Mar. 31, 2015

(54) FLOATING CATALYST/REGENERATOR

(75) Inventor: Doug Vanderwees, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 386 days.

(21) Appl. No.: 13/484,626

(22) Filed: May 31, 2012

(65) Prior Publication Data

US 2013/0323135 A1 Dec. 5, 2013

(51) Int. Cl.
| | |
|---|---|
| *B01J 35/02* | (2006.01) |
| *F28D 7/10* | (2006.01) |
| *F28F 1/10* | (2006.01) |
| *B01J 35/00* | (2006.01) |
| *B01J 8/00* | (2006.01) |
| *B01J 8/02* | (2006.01) |
| *B01J 19/00* | (2006.01) |
| *B01J 19/24* | (2006.01) |

(Continued)

(52) U.S. Cl.
CPC ............... *B01J 19/249* (2013.01); *B01J 8/025* (2013.01); *B01J 8/0285* (2013.01); *B01J 19/2495* (2013.01); *B01J 2208/00221* (2013.01); *B01J 2208/0053* (2013.01); *B01J 2208/00849* (2013.01); *B01J 2219/2459* (2013.01); *B01J 2219/2464* (2013.01); *B01J 2219/2479* (2013.01); *B01J 2219/2487* (2013.01); *C01B 3/38* (2013.01); *C01B 2203/0233* (2013.01); *C01B 2203/0244* (2013.01); *C01B 2203/0261* (2013.01); *C01B 2203/1005* (2013.01); *C01B 2203/1082* (2013.01); *C01B 2203/1217* (2013.01); *C01B 2203/1235* (2013.01); *F28D 7/103* (2013.01); *F28D 2021/0022* (2013.01); *F28F 1/105* (2013.01)

USPC ............ 422/211; 422/129; 422/187; 422/198

(58) Field of Classification Search
CPC .............. B01J 8/00; B01J 8/02; B01J 8/0285; B01J 8/0292; B01J 19/00; B01J 19/24; B01J 19/245; B01J 19/248; B01J 35/00; B01J 35/02; C01B 3/00; C01B 3/02; C01B 3/32; C01B 3/38
USPC .................................. 422/129, 187, 211, 198
See application file for complete search history.

(56) References Cited

U.S. PATENT DOCUMENTS

| | | |
|---|---|---|
| 3,474,513 A | 10/1969 | Allingham |
| 5,733,675 A | 3/1998 | Dederer et al. |

(Continued)

FOREIGN PATENT DOCUMENTS

| | | |
|---|---|---|
| JP | 404089301 | 3/1992 |
| JP | 2010-260734 A | 11/2010 |
| WO | WO 2004-059232 | 7/2004 |

*Primary Examiner* — Natasha Young
(74) *Attorney, Agent, or Firm* — Marshall & Melhorn, LLC

(57) ABSTRACT

A fuel processor with a floating catalyst has a reactant gas passage and a product gas passage separated by a separating wall which is fixed at one end and free at the other end, to permit differential thermal expansion. The catalyst is received inside the separating wall proximate to the free end. An outer wall at least partially surrounds the separating wall and the fixed end of the separating wall may be joined to the outer wall. The fuel processor may comprise a plurality of concentric tubes, and may include a third tube located inside the separator wall. The gas passages are provided with gas permeable support structures such as turbulizers or fins which support the separating wall relative to the outer wall, but the support structures are bonded to only one tube in order to permit differential thermal expansion of the walls.

16 Claims, 13 Drawing Sheets

(51) Int. Cl.
*C01B 3/00* (2006.01)
*C01B 3/02* (2006.01)
*C01B 3/32* (2006.01)
*C01B 3/38* (2006.01)
*F28D 21/00* (2006.01)

(56) References Cited

U.S. PATENT DOCUMENTS

| | | |
|---|---|---|
| RE35,890 E | 9/1998 | So |
| 6,273,183 B1 | 8/2001 | So et al. |
| 6,299,994 B1 * | 10/2001 | Towler et al. .................. 429/412 |
| 6,953,009 B2 | 10/2005 | Reinke et al. |
| 7,141,223 B2 | 11/2006 | Kadowaki et al. |
| 7,220,392 B2 | 5/2007 | Rong et al. |
| 2002/0141924 A1 * | 10/2002 | Ishikawa ....................... 423/246 |
| 2003/0044334 A1 | 3/2003 | Kadowaki et al. |
| 2003/0054215 A1 | 3/2003 | Doshi et al. |
| 2004/0178765 A1 | 9/2004 | O'Brien et al. |
| 2007/0151152 A1 * | 7/2007 | Mukai et al. ................. 48/127.9 |
| 2007/0196704 A1 | 8/2007 | Valensa et al. |
| 2009/0133259 A1 | 5/2009 | Yoshida et al. |
| 2010/0146954 A1 | 6/2010 | Sloss et al. |
| 2011/0067303 A1 | 3/2011 | Kadowaki et al. |
| 2011/0302910 A1 | 12/2011 | Burgers et al. |
| 2011/0318660 A1 | 12/2011 | Mukai et al. |

* cited by examiner

US 8,992,850 B2

FLOATING CATALYST/REGENERATOR

FIELD OF THE INVENTION

The invention relates to catalytic fuel processors having a simplified construction.

BACKGROUND OF THE INVENTION

Fuel cell systems commonly include a fuel processor to convert readily available hydrogen-containing fuels such as hydrocarbons and low molecular weight alcohols to a reformate containing molecular hydrogen which is reacted with oxygen in the fuel cell. Known processes for generating molecular hydrogen from hydrogen-containing fuels include steam reformation (SR), partial oxidation and autothermal reformation (ATR). In these processes the hydrogen-containing fuel is reacted with steam and/or oxygen in the presence of a catalyst. The catalytic reaction is conducted at an elevated temperature, and may be endothermic or exothermic depending on which process is used.

In order to maintain the catalyst at its optimum operating temperature, it is desirable to pre-heat the reactants before they contact the catalyst. In some fuel processors, the preheating of the gaseous reactants is accomplished, at least in part, by heat exchange with the hot gaseous reformate produced by the catalytic reaction. Therefore, fuel processors of this type will include a heat exchange section and a catalyst section.

An example of a known catalytic fuel processor is shown in International Publication No. WO 2004/059232 (Rong et al.). The fuel processor of Rong et al. includes a shell-and-tube heat exchanger for pre-heating the gaseous reactants by heat exchange with the hot reformate. The heat exchanger has a floating header which permits the heat exchanger tubes to expand axially, thereby reducing the potentially damaging effects of thermal stresses produced by differential thermal expansion of the tubes and the shells. However, the shell-and-tube construction of the Rong et al. fuel processor requires a large number of parts, and therefore has relatively high material and assembly costs. Also, the large number of parts means that there are many joints at which leaks may develop.

There is a need for a fuel processor which is simpler and less costly to produce, while retaining the ability to minimize thermal stresses.

SUMMARY OF THE INVENTION

In one aspect, there is provided a fuel processor, comprising:
(a) a reactant gas passage;
(b) a product gas passage;
(c) a separating wall which separates the reactant gas passage from the product gas passage, the separating wall having a fixed end and a free end, wherein the fixed end is proximate to a reactant gas port and a product gas port;
(d) a catalyst received inside the separating wall proximate to the free end thereof, wherein the reactant gas passage extends from the reactant gas port to the catalyst and the product gas passage extends from the catalyst to the product gas port;
(e) an outer wall which surrounds the separating wall throughout at least a portion of its length; and
(f) a first layer of gas permeable support structure provided between, and in contact with, the separating wall and the outer wall, wherein the first layer of gas permeable support structure is located between the fixed end and the free end of the separating wall;
wherein the separating wall extends continuously from the fixed end thereof to the catalyst and wherein the product gas passage is in heat exchange contact with the reactant gas passage between the fixed end and the free end of the separating wall.

In another aspect, the fixed end of the separating wall may be joined to the outer wall.

In another aspect, at least a portion of the reactant gas passage may be located between the separating wall and the outer wall.

In yet another aspect, at least a portion of the product gas passage may be located between the separating wall and the outer wall.

In yet another aspect, the outer wall may comprise a housing having an end wall, and the end wall may be spaced from the free end of the separating wall so as to form an inlet space at which the reactant gas enters the catalyst.

In yet another aspect, the separating wall and the outer wall may each comprise cylindrical walls extending parallel to a gas flow axis and arranged concentrically with one another, such that at least a portion of one of the reactant gas passage and the product gas passage is located in an annular space between the separating wall and the outer wall.

In yet another aspect, the annular space between the separating wall and the outer wall comprises the reactant gas passage. According to this aspect, the reactant gas port may be located in the outer wall and/or the first layer of gas permeable support structure may be located in said annular space and surrounds the separating wall along at least a portion of its length. The first layer of gas permeable support structure may be a corrugated fin or a turbulizer.

In yet another aspect, a third cylindrical tube is located inside the separating wall, wherein the third cylindrical tube has at least one closed end, and wherein the third cylindrical tube is parallel to the gas flow axis such that an inner annular space is provided between the third tube and the separating wall. According to this aspect, a second layer of gas permeable support structure is provided in the inner annular space, and surrounds the third tube along at least a portion of its length, wherein the second layer of gas permeable support structure in the inner annular space is a corrugated fin or turbulizer. The third cylindrical tube may have a first closed end proximate to the catalyst and a second end with a hole proximate to the fixed end of the separating wall, wherein the fuel processor further comprises an inlet tube extending from the reactant gas port which is formed in the outer wall, to a hollow interior of the third tube through said hole. Also, at least one of the separating wall and the third cylindrical tube may be provided with radially extending dimples along which the separating wall and the third tube are joined together, and wherein apertures are provided in portions of the separating wall and the third cylindrical tube which are joined together by said dimples, such that a hollow interior of the third tube is in flow communication with the reactant gas passage located between the separating wall and the outer wall.

In yet another aspect, the reactant gas passage and the product gas passage may be oriented substantially parallel to a gas flow axis, and each of the reactant gas passage and the product gas passage may undergo at least one change in direction of about 180 degrees along its length. For example, each of the reactant gas passage and the product gas passage may undergo at least two changes in direction along its length. The outer wall may comprise a housing having an end wall, wherein the end wall is spaced from the free end of the separating wall so as to form an inlet space at which the reactant gas enters the catalyst, and wherein one of said changes in direction in the reactant gas passage is located in said inlet space.

In yet another aspect, the catalyst is contained in a cylindrical catalyst container, and the catalyst container is frictionally retained within the separating wall. A layer of compressible material may be provided between the catalyst container and the separating wall.

In yet another aspect, the separating wall has a serpentine shape and is completely enclosed by the outer wall. According to this aspect, the separating wall may comprise at least an outer cylindrical wall, a middle cylindrical wall and an inner cylindrical wall which are radially spaced apart from one another, wherein a bottom of the outer cylindrical wall is joined to a bottom of the middle cylindrical wall through an outer annular wall, and wherein a top of the middle cylindrical wall is joined to a top of the inner cylindrical wall through an inner annular wall. The fixed end of the separating wall may be proximate to a top of the outer cylindrical wall and the free end of the separating wall may be provided at a bottom of the inner cylindrical wall distal from the inner annular wall, and the catalyst may be received inside the inner cylindrical wall. Also, the fixed end may be secured to a top wall of the outer wall by a rigid connection.

In yet another aspect, a first cylindrical baffle extends downwardly from the top wall into an annular space between the outer cylindrical wall and the middle cylindrical wall of the separating wall, so as to provide a U-shaped passage for flow of the reactant gas. According to this aspect, the outer wall may further comprise a bottom wall opposite to the top wall, and a second cylindrical baffle may extend upwardly from the bottom wall into an annular space between the middle cylindrical wall and the inner cylindrical wall of the separating wall, so as to provide a U-shaped passage for flow of the product gas. Also, according to this aspect, the first layer of gas permeable support structure may be located between the outer cylindrical wall of the separating wall and the outer wall, and the fuel processor may further comprise a second layer of gas permeable support structure between the outer cylindrical wall and the first baffle, a third layer of gas permeable support structure between the first baffle and the middle cylindrical wall of the separating wall, and a fourth layer of gas permeable support structure between the middle cylindrical wall of the separating wall and the second baffle.

BRIEF DESCRIPTION OF THE DRAWINGS

The invention will now be described, by way of example only, with reference to the accompanying drawings in which.

DETAILED DESCRIPTION

Figure 1:
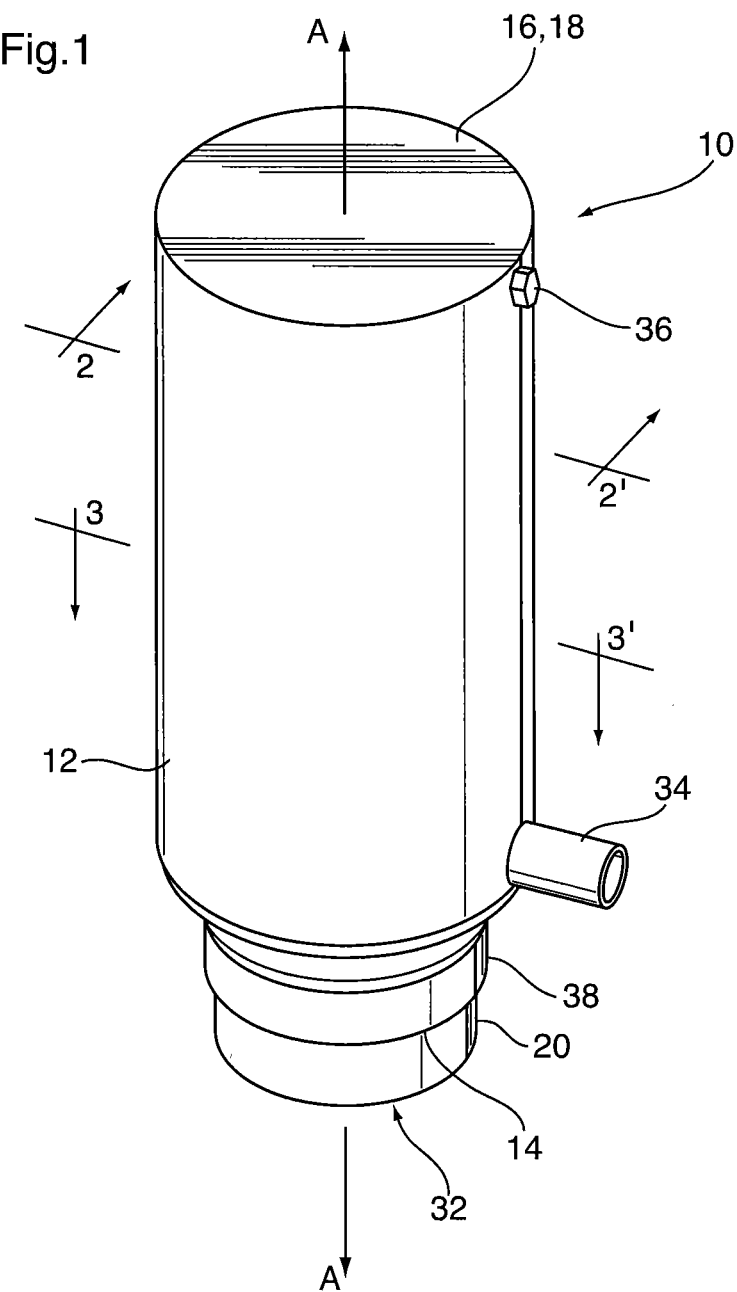
FIG. 1 is a perspective view of a fuel processor according to a first embodiment of the invention.

Specific embodiments of the fuel processor according to the invention are now described below with reference to the drawings. Fuel processors according to the invention can be used to produce a hydrogen-containing reformate from any convenient hydrocarbon or low molecular weight alcohol, using a catalytic fuel transformation process such as steam reformation, partial oxidation or autothermal reformation.

For example, the hydrogen-containing fuel may comprise a hydrocarbon fuel selected from one or more petroleum fractions such as gasoline, naphtha, kerosene, diesel fuel, etc.; natural gas or one or more components thereof, including methane, ethane, propane, etc. Alternatively, the hydrogen-containing fuel may comprise one or more alcohols such as methanol and ethanol.

In the fuel processor the hydrogen-containing fuel undergoes a catalyzed reaction with water (steam) and/or molecular oxygen. The oxygen is usually supplied as air. The hydrogen-containing fuel can either be mixed within the fuel processor or upstream of the fuel processor, and the mixture of hydrogen-containing fuel with steam and/or oxygen is referred to herein as the "reactant gas" or simply the "reactant". The hot reformate produced by the catalytic reaction is generally referred to herein as the "reformate", the "product gas" or simply the "product".

As used herein, the terms "inner" and "outer" are used as terms of reference to describe the relative radial locations of certain elements of fuel processors with respect to a central longitudinal axis.

A fuel processor 10 according to a first embodiment of the invention is illustrated in FIGS. 1 to 5. Fuel processor 10 is constructed from a plurality of concentric, cylindrical tubes which define a longitudinal axis A and which define the direction of flow for both the reactant and product gases.

Fuel processor 10 includes an outer wall 12 with an open end 14 and an opposite closed end 16. The open end 14 may be provided with an axially-extending collar portion 38 which is reduced in diameter relative to the remainder of the outer wall 12, for reasons which will become apparent below. A reactant gas port 30 to receive the gaseous reactant is provided in the outer wall 12, proximate to the open end 14. The reactant gas port 30 is provided with a reactant gas inlet fitting 34 through which fuel processor 10 receives the reactant gas from an external source (not shown). At the closed end 16 of outer wall 12 there is provided an end wall 18. The outer wall 12, end wall 18 and reactant gas inlet fitting 34 may together comprise an outer housing of fuel processor 10.

Received in an aperture of outer wall 12 is an electrical heater element 36, the purpose of which will be described below. The heater element 36 is connected to an external source of electricity (not shown). Rather than being received through an aperture in the outer wall 12, the heater element 36 may be received through an aperture in the end wall 18.

The fuel processor 10 further comprises a separating wall 20 which separates a reactant gas passage 22 from a product gas passage 24. The separating wall 20 is open at both ends and is received inside the open end 14 of the outer wall 12, such that the outer wall 12 surrounds the separating wall 20 along at least a portion of its length. In this embodiment the reactant gas passage 22 is located between outer wall 12 and separating wall 20, and is located radially outwardly of the product gas passage 24, which is located inside the separating wall.

The separating wall 20 has a fixed end 26 which is proximate to a rigid connection 28 at which the open end 14 of outer wall 12 is secured to the separating wall 20. As can be seen from the drawings, the rigid connection 28 closes an annular gap between the outer wall 12 and the separating wall 20, thereby sealing one end of the reactant gas passage 22. In the embodiment shown in the drawings, the annular gap is closed by reducing the diameter of the outer wall 12 at its open end 14, and providing an axially-extending collar 38 which is rigidly secured to the outer surface of separating wall 20, for example by brazing or welding. However, it will be appreciated that there are other ways to close the annular gap between the outer wall 12 and the separating wall 20. For example, the separating wall 20 could be increased in diameter at the fixed end 26, either with or without the outer wall 12 being reduced in diameter. Alternatively, the open end 14 of outer wall 12 and the fixed end 26 of separating wall 20 can be of constant diameter, with the annular gap being filled by an annular sealing ring (not shown). Alternatively, the separating wall 20 could be closed at its fixed end 26, with the product gas port 32 being provided in the side of separating wall 20, or a smaller opening could be provided for product gas port 32 at the fixed end of separating wall.

The fixed end 26 of separating wall 20 is located proximate to a reactant gas port 30 (already mentioned above) and a product gas port 32 through which the reformate is discharged. The product gas port 32 in this embodiment is formed by the open, fixed end 26 of the separating wall 20, which projects from the open end 14 of outer tube 12 and is adapted for direct or indirect connection to a component of the fuel cell system (not shown) in which the reformate is further processed or consumed. Although the fixed end 26 of separating wall 20 projects beyond the open end 14 of outer tube 12, it will be appreciated that this arrangement is not essential. Rather, it is possible to extend the open end 14 of outer tube 12 beyond the fixed end 26 of the separating wall 20, for example by terminating the separating wall 20 at the rigid connection 28 and extending the collar portion 38 beyond the rigid connection 28. The collar portion 38 would then be adapted for connection to another component of the fuel cell system, either directly or indirectly through a conduit such as a pipe or tube (not shown). It is also possible for the outer wall 12 to completely enclose the separating wall 20, and to provide the product gas port 32 through the outer wall 12.

Figure 2:
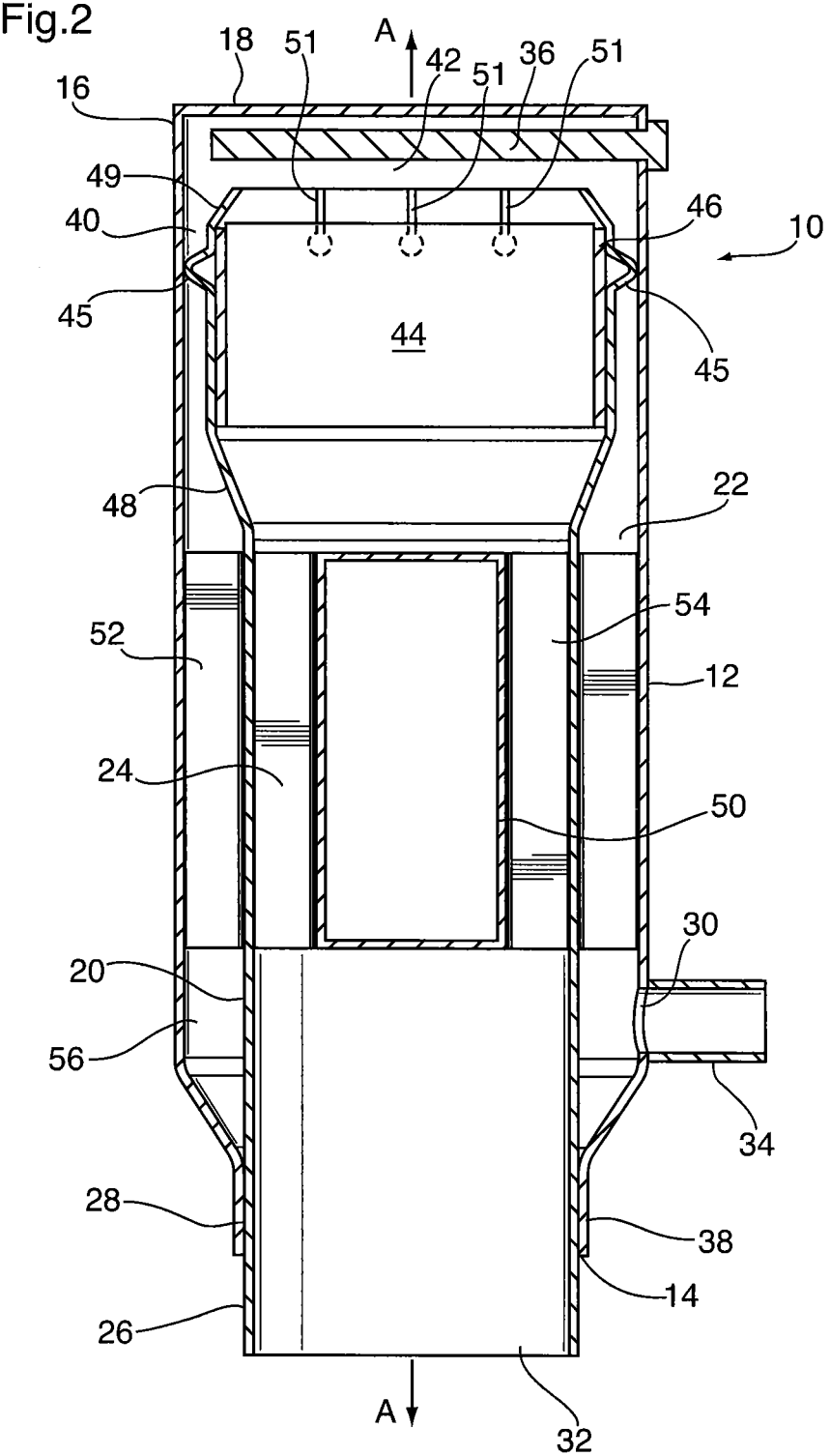
FIG. 2 is a longitudinal cross-section along line 2-2' of FIG. 1.
Figure 3:
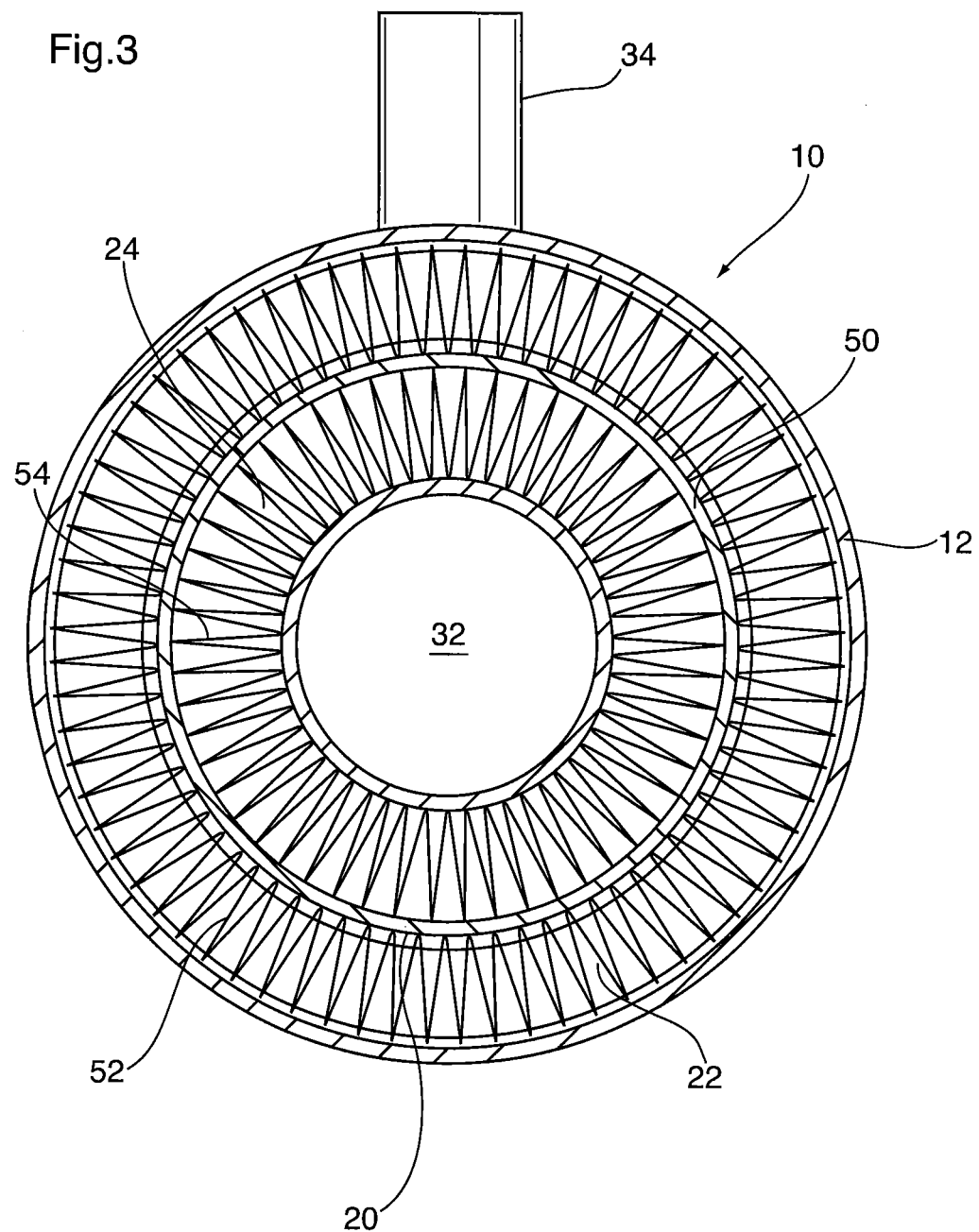
FIG. 3 is a transverse cross-section along line 3-3' of FIG. 1.
Figure 4:
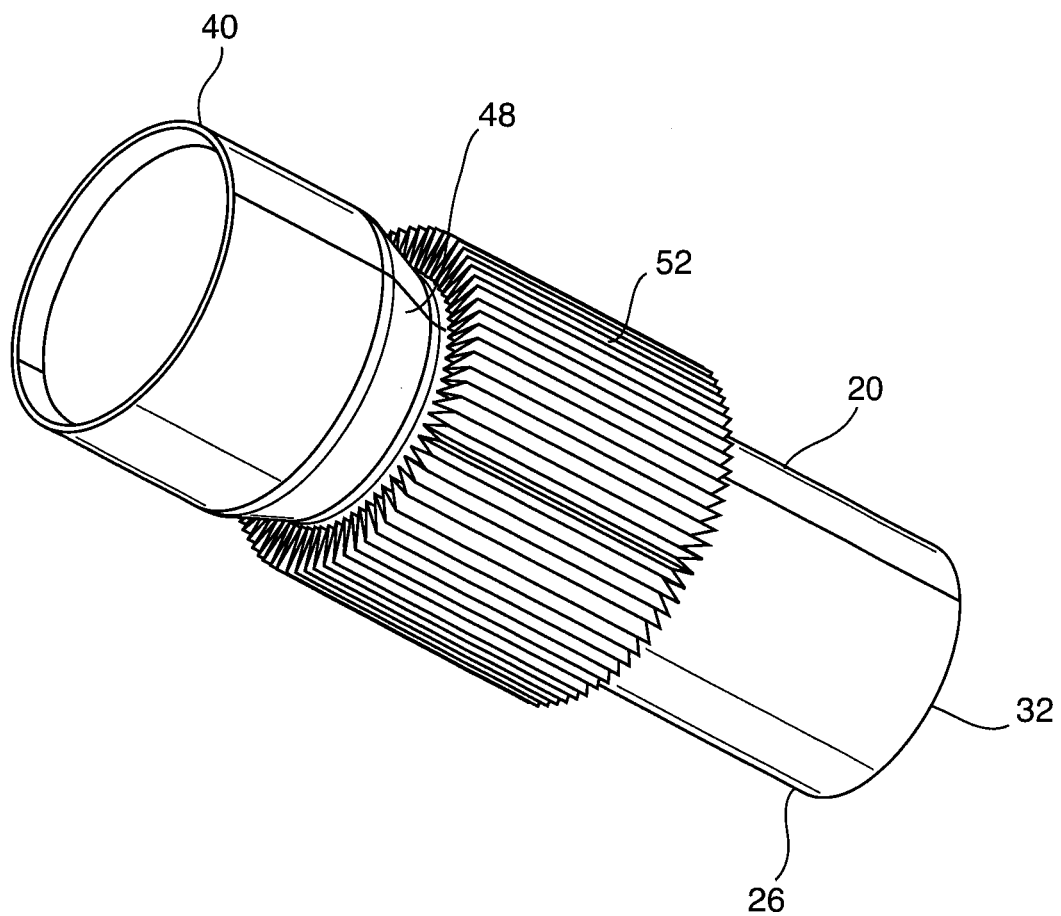
FIG. 4 is a side perspective view of the separating wall and outer support structure of the fuel processor of FIG. 1.
Figure 5:
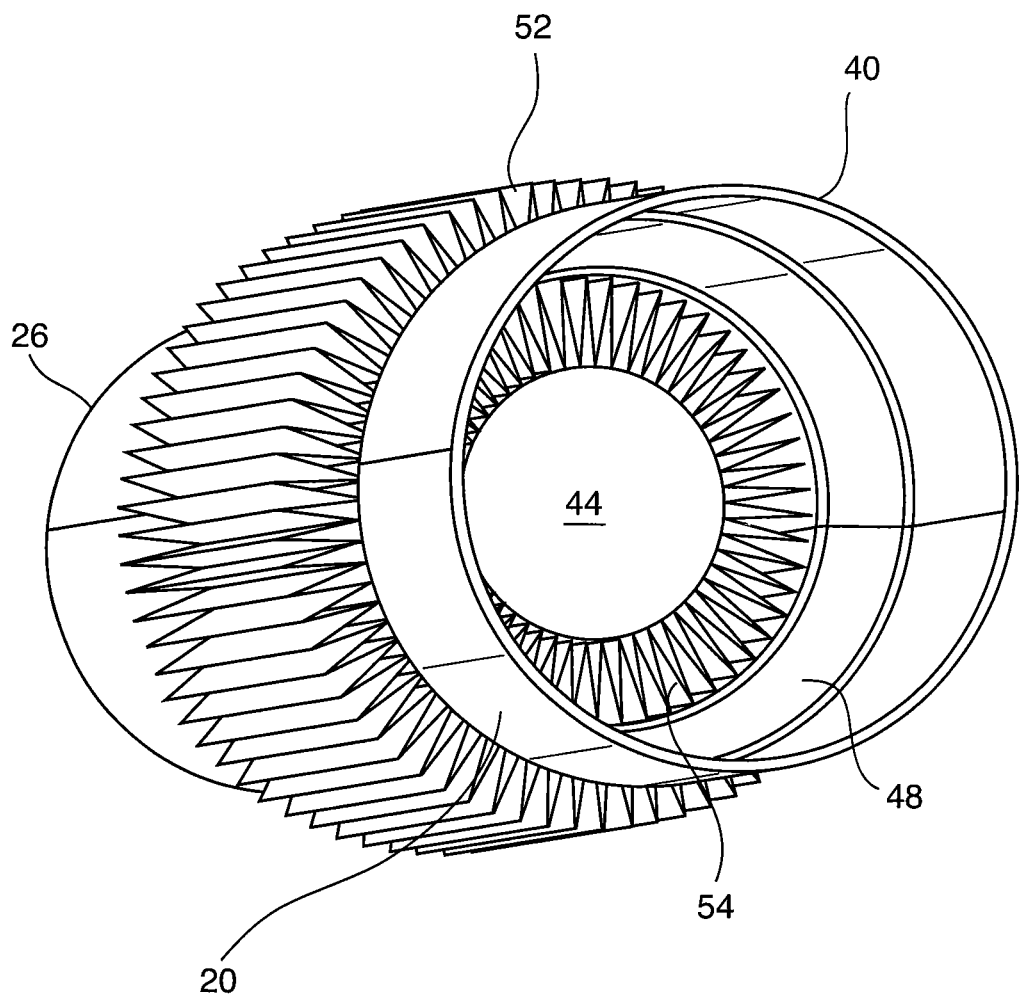
FIG. 5 is a top perspective view of the separating wall and outer support structure of the fuel processor of FIG. 1.
Figure 6:
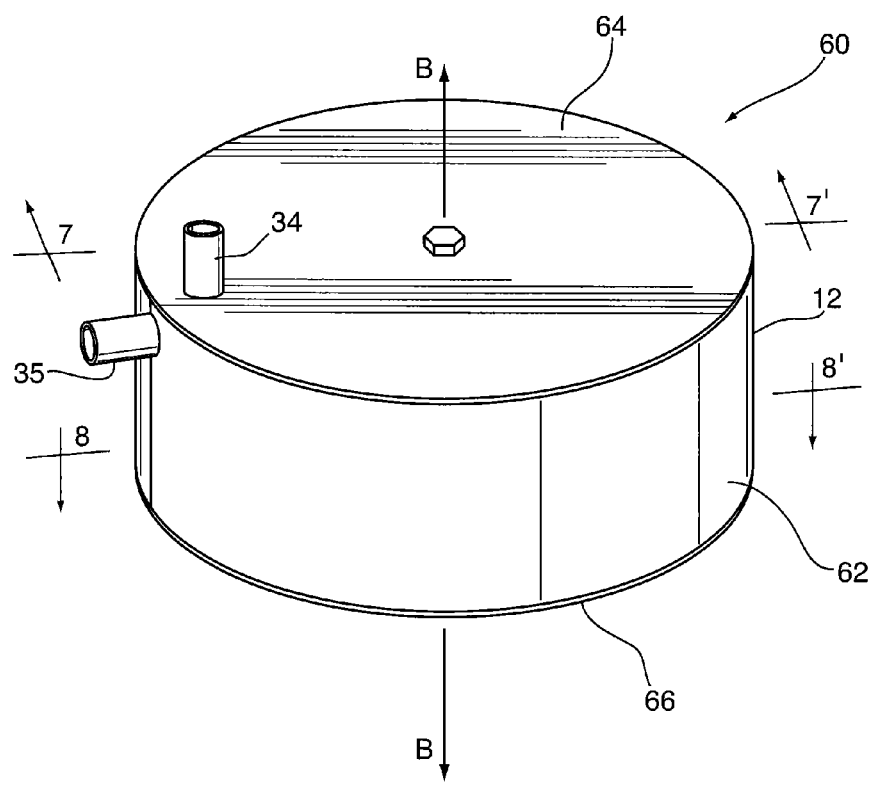
FIG. 6 is a perspective view of a fuel processor according to a second embodiment of the invention.

The separating wall 20 also has a free end 40 which is located proximate to the closed end 16 of the outer wall 12. The free end 40 is spaced from both the outer wall 12 and the end wall 18, and the end wall 18 is sufficiently spaced from the free end 40 of the separating wall 20 so as to form an inlet space 42 at which the reactant gas enters the free end 40 of separating wall 20. As shown in FIG. 2, the separating wall 20 may be provided with a plurality of discretely formed dimples 45 which extend outwardly into the reactant gas passage 22 toward the outer wall 12. These dimples 45 are provided to keep the separating wall 20 centered within the outer wall 12. Two dimples 45 are shown in FIG. 2 (note that the dimples are not shown in FIG. 5), there may be more than two dimples spaced circumferentially about the separating wall 20. Although dimples 45 are used as spacers between the walls 12 and 20, it will be appreciated that alternate spacers could be provided. For example, the outer wall 12 could be formed with inwardly extending dimples, or a separate spacer element could be provided between the walls 12 and 20. Regardless of the type of spacers, it will be understood that the spacers do not form a rigid connection between the walls 12 and 20.

Located inside separating wall 20, proximate to the free end 40, is a catalyst bed 44. The catalyst bed 44 comprises a catalyst for a high-temperature catalytic reaction such as steam reformation (SR), partial oxidation or autothermal reformation (ATR). The catalyst bed 44 comprises a catalyst material supported on a porous support structure. In this embodiment, the catalyst bed is in the form of a cylinder which is sized to fit snugly within the free end 40 of the separating wall 20. As shown in FIG. 2 the free end 40 of separating wall 20 may be folded inwardly, as shown at 49, to improve retention of the catalyst inside the separating wall 20. The inward folding of free end 40 may be facilitated by providing axially-extending slits 51 spaced circumferentially around the edge of free end 40, and the folding may be further facilitated by providing an enlarged area at the base of each slit 51, as shown in FIG. 2. The folded edge 49 and slits 51 are not shown in FIG. 5.

The support structure may comprise one or more corrosion and heat resistant materials such as ceramics or refractory materials, and is in a form which promotes contact between the flowing gases and the catalyst material within the fuel processor. Examples of support materials include magnesia, alumina, silica and zirconia, and mixtures thereof, and the support structure may be in the form of beads or grids, for example extruded ceramic monolith grids. In the alternative, the catalyst support or the catalyst itself may comprise a corrugated, rolled metal foil which may, for example, be in the form of a slit and convoluted shape, such as a turbulizer. Regardless of the form of the catalyst material or the support structure, the catalyst material is arranged so as not to unduly restrict the flow of the reactant gas and the reformate.

The catalyst bed 44 and the separating wall 20 are not secured together in any way, and therefore thermal stresses caused by differential thermal expansion of the catalyst bed 44 and separating wall 20 are avoided. Located between the catalyst bed 44 and the separating wall 20 is a thin layer 46 of a heat-resistant compressible material such as a ceramic fibre felt. The felt layer 46 serves to support the catalyst bed 44 and to prevent blowby gas flow at the edges of the catalyst bed 44.

In the illustrated embodiment the catalyst bed 44 is also maintained in position and supported by an inwardly inclined shoulder 48 which is formed in the separating wall and which decreases the diameter of the separating wall 20 toward the fixed end 26.

Having now described the outer wall 12 and the separating wall 20, it can be seen that the reactant gas passage 22 is defined by the annular space between the separating wall 20 and the outer wall 12. The reactant gas passage 22 extends from the reactant gas port 30 to the inlet space 42 between the end wall 18 and the free end 40 of separating wall 20. In this inlet space 42 the reactant gas changes direction and enters the catalyst bed 44.

The reactant gas undergoes a catalytic reaction within the catalyst bed 44 and is converted to reformate which exits the catalyst bed 44 and enters the reactant gas passage 24. The passage 24 extends from the catalyst bed 44 to the product gas port 32, with the reformate and the reactant gas being in counterflow, i.e. flowing in opposite directions in their respective flow passages 24, 22. While the gases are flowing through the fuel processor 10, heat is transferred through the separating wall 20 from the relatively hot reformate to the relatively cool reactant gas, thereby pre-heating the reactant gas. The heater element 36 may be used as needed to provide supplemental heat to the reactant gas, so as to maintain the catalyst at or near its optimal operating temperature.

Heat transfer between the reformate and the reactant gas can be enhanced by providing the product gas passage 24 in the form of an annular passage, so as to cause the hot reformate to flow along the separating wall 20. This is accomplished by providing a third wall 50 inside the separating wall 20. The third wall 50 is in the form of a cylindrical tube which is aligned with axis A and is concentric with the separating wall 20 and the outer wall 12. The third wall 50 is a "dead" or "blind" tube, meaning that it is closed at one or both ends so as to prevent the flow of reformate through its hollow interior. The third wall 50 shown in the drawings is closed at both ends.

The fuel processor 10 further comprises an outer gas permeable support structure 52 in the reactant gas passage 22 between the separating wall 20 and the outer wall 12. Also, where the product gas passage 24 is annular, an inner gas permeable support structure 54 is provided in the product gas passage 24, and is located between the separating wall 20 and the third tube 50. The gas permeable support structures 52, 54 serve two functions: firstly, to support the walls 12, 20 and 50 and to maintain their concentric arrangement; and secondly, to increase turbulence in the reactant gas and the reformate, thereby improving heat transfer through the separating wall 20.

The gas permeable support structures 52, 54 may be in the form of turbulence-enhancing inserts such as fins or turbulizers. As used herein, the terms "fin" and "turbulizer" are intended to refer to corrugated turbulence-enhancing inserts having a plurality of axially-extending ridges or crests connected by side walls, with the ridges being rounded or flat. As defined herein, a "fin" has continuous ridges whereas a "turbulizer" has ridges which are interrupted along their length, so that axial flow through the turbulizer is tortuous. Turbulizers are sometimes referred to as offset or lanced strip fins, and examples of such turbulizers are described in U.S. Pat. No. Re. 35,890 (So) and U.S. Pat. No. 6,273,183 (So et al.). The patents to So and So et al. are incorporated herein by reference in their entireties.

The gas permeable support structures 52, 54 are received within respective passages 22, 24 such that the low pressure drop direction of the support structures 52, 54 (i.e. with the fluid encountering the leading edges of the corrugations) is oriented parallel to the direction of gas flow in passages 22 and 24. With the support structures 52, 54 in this orientation there is a relatively low pressure drop in the direction of flow.

The gas permeable support structures 52, 54 shown in the drawings comprise simple corrugated fins with sloped side walls. Although the ridges of support structures 52, 54 are shown in the drawings as being sharply angular or pointed, it will be appreciated that the corrugations are formed by bending a sheet of metal, and therefore the ridges will have a rounded surface with a small radius, and these rounded surfaces at the ridges are in contact with the walls 12, 20 or 50, as further described below.

The outer gas permeable support structure 52 is in the form of a corrugated sheet which is wrapped around the separating wall 20, with the inner ridges of support structure 52 being in contact with the outer surface of the separating wall 20 and the outer ridges of support structure 52 being in contact with the inner surface of the outer wall 12. Similarly, the inner gas permeable support structure 54 is in the form of a corrugated sheet which is wrapped around the third wall 50, with the inner ridges of support structure 54 being in contact with the outer surface of third wall 50 and the outer ridges of support structure 54 being in contact with the inner surface of the separating wall 20. This is best seen in the cross-section of FIG. 3.

The gas permeable support structures 52, 54 may extend throughout the entire lengths of respective flow passages 22, 24 or they may be provided only in those portions of passages 22, 24 where they will have the most beneficial effect. In this regard, the outer gas permeable support structure 52 is shown in the drawings as extending from a point which is slightly downstream (in the direction of reactant gas flow) from the reactant gas port 30 to a point which is proximate to the shoulder 48 of the separating wall 20. In this area the reactant gas is in heat exchange contact with the hot reformate exiting the catalyst bed 44. The support structure 52 does not extend into the area of the reactant gas port 30 so as to leave an unobstructed circumferential manifold space 56 in which the incoming reactant gas is evenly distributed as it enters the support structure 52.

The inner gas permeable support structure 54 is shown as extending along the entire length of the third wall 50, and having an axial length substantially the same as that of the outer gas permeable support structure 52. This exact arrangement is not essential, however, and it will be appreciated that the third wall 50 may either be longer or shorter than shown in the drawings, and/or the support structure 54 may not necessarily extend along the entire length of the third wall 50.

To accommodate differential thermal expansion of walls 12, 20 and 50, and thereby minimize thermal stresses within fuel processor 10, the inner and/or outer ridges of the corrugations of support structures 52, 54 may be left unbonded from the surfaces of tubes with which they are in contact. For example, the inner ridges of the outer gas permeable support structure 52 may be bonded to the outer surface of the separating wall 20, for example by brazing or welding, while the outer ridges of the outer gas permeable support structure 52 may be in contact with, but unbonded to, the inner surface of the outer wall 12. Similarly, the outer ridges of the inner gas permeable support structure 54 may be bonded to the inner surface of the separating wall 20, for example by brazing or welding, while the inner ridges of the inner gas permeable support structure 54 may be in contact with, but unbonded to, the outer surface of the third wall 50. Bonding of the support structures 52, 54 to the separating wall 20 enhances heat transfer between the product gas and reactant gas streams. However, the support structures 52, 54 do not provide any additional rigid connections between the three walls 12, 20 and 50, and therefore do not impede differential thermal expansion of the walls.

In the illustrated embodiment the outer gas permeable support structure 52 is in direct contact with the inner surface of the outer wall 12, however, this is not the case in all embodiments of the invention. In some embodiments a layer of heat resistant insulating material (not shown) is provided between the outer gas permeable support structure 52 and the inner surface of the outer wall 12 in order to prevent blow-by and to decrease heat transfer loss to the outside environment.

A fuel processor 60 according to a second embodiment of the invention is illustrated in FIGS. 6 to 14. Fuel processor 60 is a more compact version of fuel processor 10 described above, with the gas flow undergoing several changes in direction to compensate for the reduced height of the fuel processor 60. However, the basic construction and operation of fuel processor 60 is similar to that of fuel processor 10, and fuel processors 10 and 60 share many like components, which are identified in the following description with like reference numerals.

Fuel processor 60 is constructed from a plurality of concentric cylindrical walls, with a central longitudinal axis B being the central axis of each of the walls. Axis B defines the direction of flow for both the reactant and product gases.

Fuel processor 60 includes an outer wall 12 (also referred to herein as the outer shell 12) which forms an outer housing of fuel processor 60 and encloses all sides of fuel processor 60. The outer shell 12 includes an outer cylindrical side wall 62, a top wall 64 which covers the top end of outer cylindrical side wall 62, and a bottom wall 66 which covers the bottom end of the outer cylindrical side wall 62. Both the top and bottom walls 64, 66 may be separate components which are sealingly secured to the outer cylindrical side wall 62 by brazing or welding, or the outer cylindrical side wall 62 may be integrally formed with either the top or bottom wall 64 or 66. For example, in FIGS. 11 and 12 the outer cylindrical side wall 62 and the bottom wall 66 of outer shell 12 are shown in isolation, with the cylindrical side wall 62 and the bottom wall 66 optionally being formed as an integral unit.

As shown in the drawings, a first cylindrical baffle 68 is provided on the inner surface of the top wall 64 and a second cylindrical baffle 70 is provided on the inner surface of the bottom wall 66. The baffles 68, 70 are sealingly secured to the respective top and bottom walls 64, 66, and extend parallel to axis B. As shown, the baffles 68, 70 have a height which is less than the height of the outer cylindrical side wall 62 of outer shell 12, for reasons which will be explained below. The first baffle 68 has a greater diameter than the second baffle 70, and therefore the first baffle 68 is located radially outwardly toward the outer cylindrical side wall 62, whereas the second baffle 70 is located radially inwardly toward the central longitudinal axis B of fuel processor 60, such that an annular gap is provided between the two baffles 68, 70. The reasons for this arrangement are also discussed below.

A reactant gas port 30 and a product gas port 32 are provided in the outer wall 12. In the illustrated embodiment the reactant gas port 30 is provided in the top wall 64, and the product gas port 32 is provided in the outer cylindrical side wall 62. The reactant gas port 30 is provided with a reactant gas inlet fitting 34 through which fuel processor 60 receives the reactant gas, and the product gas port 32 is provided with a product gas outlet fitting 35 through which the product gas is discharged from fuel processor 60. It will be appreciated that the exact locations of the inlet and outlet ports may be varied somewhat from the locations shown in the drawings. For example, the product gas port 32 and the product gas outlet fitting 35 are shown as being located in the outer cylindrical side wall 62 of outer shell 12. However, it can be seen from FIG. 7 that the product gas port 32 and fitting 35 could instead be located proximate to the outer edge of the top wall 64, anywhere along the circumference thereof.

An electrical heater element 36 is received in an aperture 37 (FIGS. 13 and 14) of outer wall 12 to provide supplemental heating of the reactant gas, where required, and is connected to an external source of electricity (not shown). In the specific embodiment shown in the drawings, the heater 36 is received through the top wall 64, and is centrally located along axis B, although the location of heater 36 can be varied from that shown in the drawings.

Fuel processor 60 further comprises a separating wall 20 which separates a reactant gas passage 22 from a product gas passage 24. The separating wall 20 has a zig-zag or serpentine cross-section and comprises three concentric cylindrical walls, namely an outer cylindrical wall 72, a middle cylindrical wall 74, and an inner cylindrical wall 76. Joining these cylindrical walls 72, 74 and 76 are two concentric radial or transverse annular walls, namely an outer annular wall 78 joining the bottoms of the outer and middle cylindrical walls 72, 74, and an inner annular wall 80 joining the tops of the middle and inner cylindrical walls 74, 76.

The separating wall 20 has a fixed end 26 at the top of the outer cylindrical wall 72. The fixed end 26 is located proximate to the reactant gas port 30 and the product gas port 32. The outer cylindrical wall 72 has a greater height than the middle and inner cylindrical walls 74, 76, and the fixed end 26 is sealingly secured by a rigid connection 28 to the top wall 64 of the outer shell 12, thereby sealing the reactant gas passage 22 from the product gas passage 24.

The separating wall 20 also has a free end 40 which is located at the bottom of inner cylindrical wall 76. Located inside separating wall 20, proximate to the free end 40, is a catalyst bed 44. The catalyst bed 44 comprises a catalyst for a high-temperature catalytic reaction as defined above, and comprises a catalyst material supported on a porous support structure as defined above. The catalyst bed 44 is in the form of a cylinder which is sized to fit snugly within the free end 40 of the separating wall 20, being received inside the inner cylindrical wall 76, and extending between the top and bottom of inner cylindrical wall 76.

The catalyst bed 44 and the separating wall 20 are not secured together in any way, and therefore thermal stresses caused by differential thermal expansion of the catalyst bed 44 and separating wall 20 are avoided. Located between the catalyst bed 44 and the separating wall 20 is a layer 46 of a heat-resistant compressible material such as a ceramic fibre felt. The felt layer 46 serves to support the catalyst bed 44 and to prevent blowby gas flow at the edges of the catalyst bed 44.

The free end 40 of separating wall 20 is spaced from the outer shell 12 and, in particular, is spaced from the bottom wall 66 by a sufficient distance to form an outlet space 43 at which the product gas exits the catalyst bed 44 and the free end 40 of separating wall 20. Also, the top of inner cylindrical wall 76 is sufficiently spaced from the top wall 64 so as to form an inlet space 42 for the reactant gas entering the catalyst bed 44. The heater 36 is located in the inlet space 42 to provide supplemental heat for the reactant gas, when required, as it enters the catalyst bed 44.

In the assembled fuel processor 60, it can be seen that the first cylindrical baffle 68 extends downwardly into the annular space between the outer and middle cylindrical walls 72, 74 of separating wall 20, thereby defining a U-shaped flow path for the reactant gas. Similarly, the second cylindrical baffle 70 extends upwardly into the annular space between the middle and inner cylindrical walls 74, 76, thereby defining a U-shaped flow path for the product gas.

Having now described the individual components of fuel processor 60, it can be seen that the reactant gas passage 22 begins at reactant gas port 30, from which the reactant gas flows downwardly and then upwardly through the U-shaped flow path defined by cylindrical walls 72, 74 and baffle 68. The reactant gas then flows inwardly between inner annular wall 80 and top wall 64, and enters inlet space 42. The product gas passage 24 begins at outlet space 43, from which the product gas flows upwardly and then downwardly through the U-shaped flow path defined by cylindrical walls 74, 76 and baffle 70, and then exits the fuel processor 60 through product gas port 32. It can be seen from the arrows in FIG. 7 that the reactant gas and the product gas are in a counterflow configuration, and are in heat exchange contact with one another through separating wall 20 from the catalyst bed 44 to the fixed end 26 of separating wall 20.

The fuel processor 60 further comprises a plurality of gas permeable support structures in both the reactant gas passage 22 and the product gas passage 24. In particular, the gas permeable support structures may be provided in all portions of the reactant and product gas passages 22, 24 where the reactant gas and the product gas flow axially and exchange heat across the separating wall 20. Due to the serpentine shape of the separating wall 20, there will be more layers of gas permeable support structures in fuel processor 60 than in fuel processor 10. However, the function and structure of the gas permeable support structures in fuel processor 60 are identical to those of the gas permeable support structures in fuel processor 10.

In particular, the gas permeable support structures of fuel processor 60 may be in the form of turbulence-enhancing inserts such as fins or turbulizers, as defined above, and are received within respective passages 22, 24 such that the low pressure drop direction of the support structures is oriented parallel to the direction of gas flow in passages 22 and 24. The gas permeable support structures of fuel processor 60 are shown as comprising simple corrugated fins with sloped side walls. Although the ridges of the support structures are shown in the drawings as being sharply angular or pointed, it will be appreciated that the corrugations are formed by bending a sheet of metal, and therefore the ridges will have a rounded surface with a small radius, and these rounded surfaces at the ridges are in contact with the cylindrical walls of fuel processor 60, as further described below.

Figure 7:
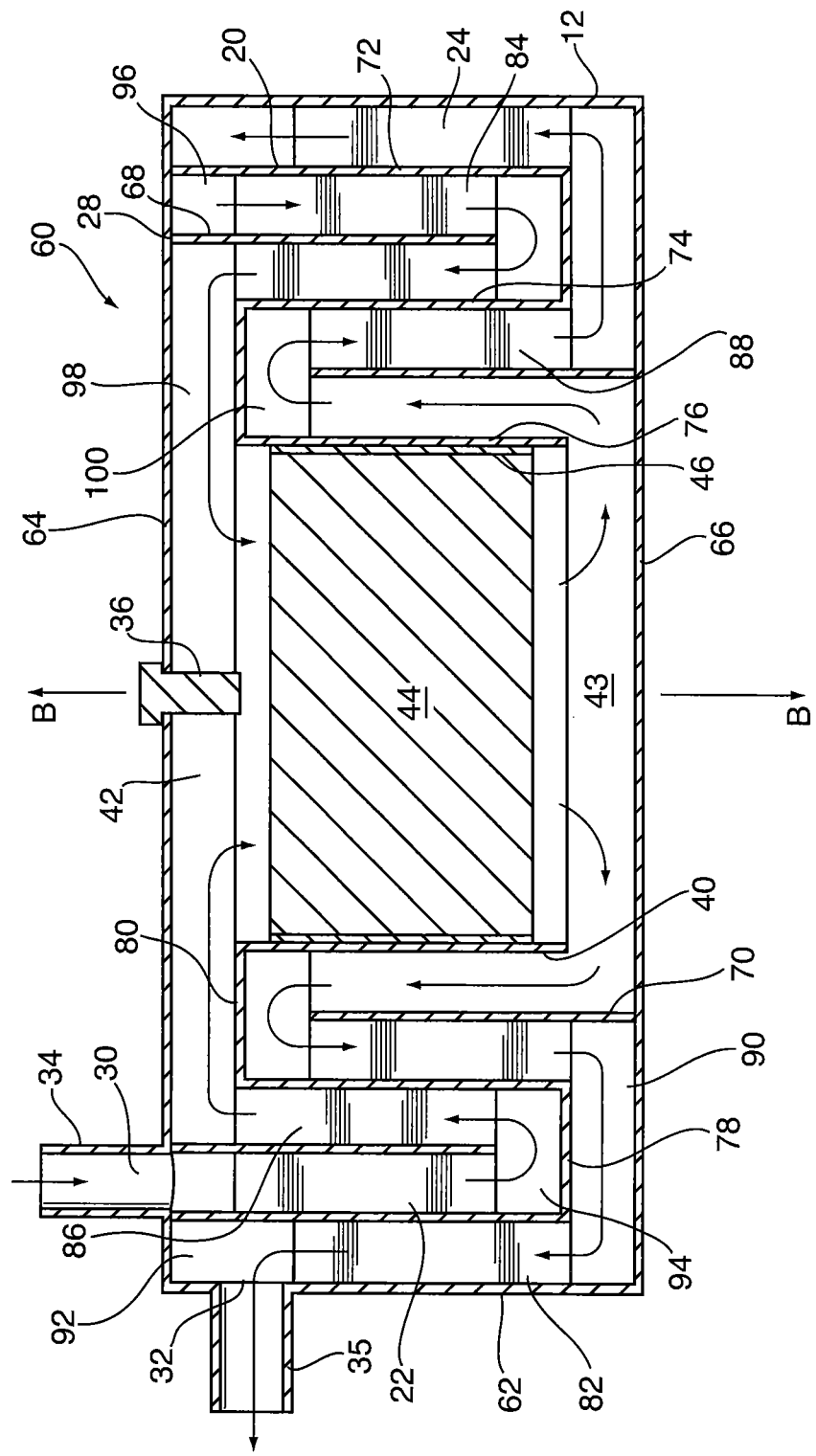
FIG. 7 is a first longitudinal cross-section along line 7-7' of FIG. 6.
Figure 8:
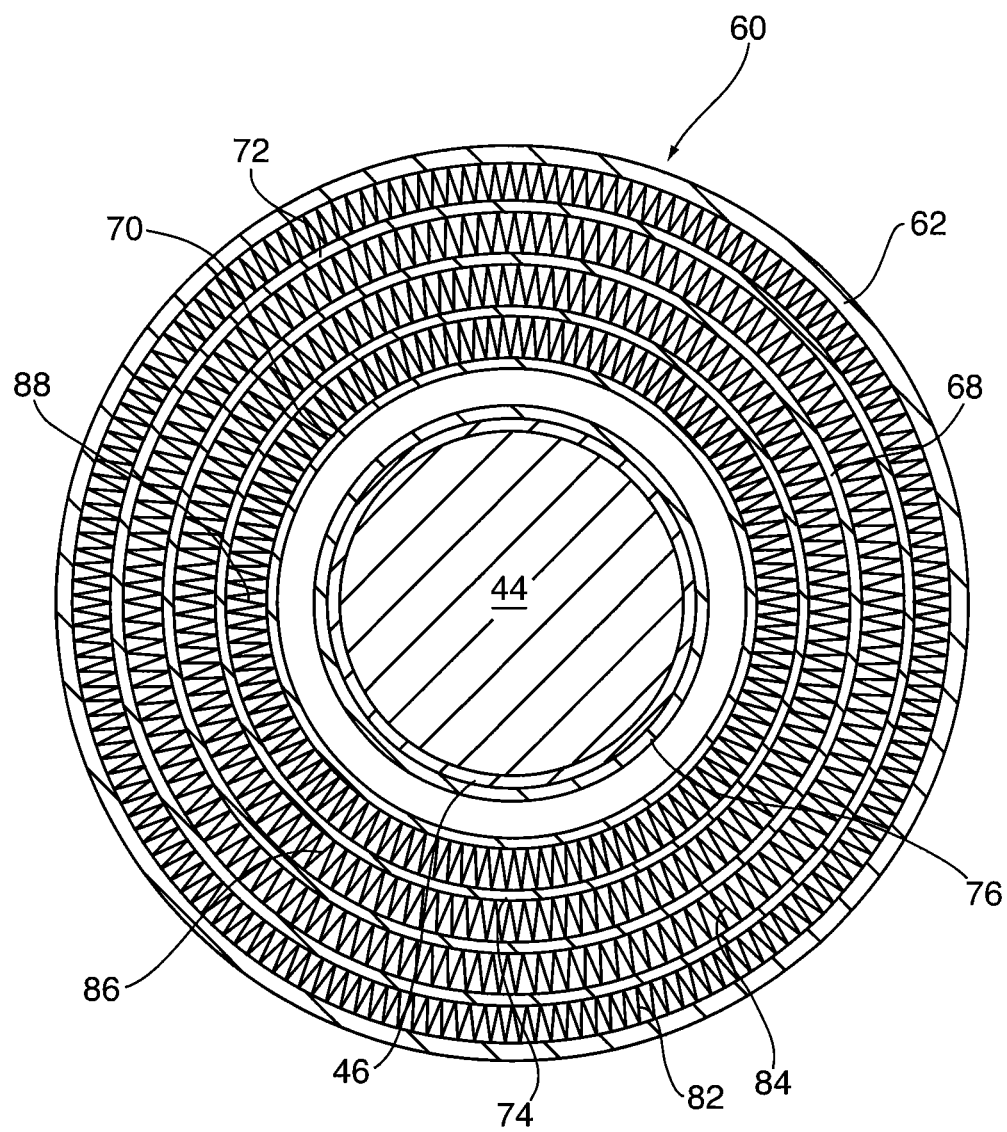
FIG. 8 is a second transverse cross-section along line 8-8' of FIG. 6.
Figure 9:
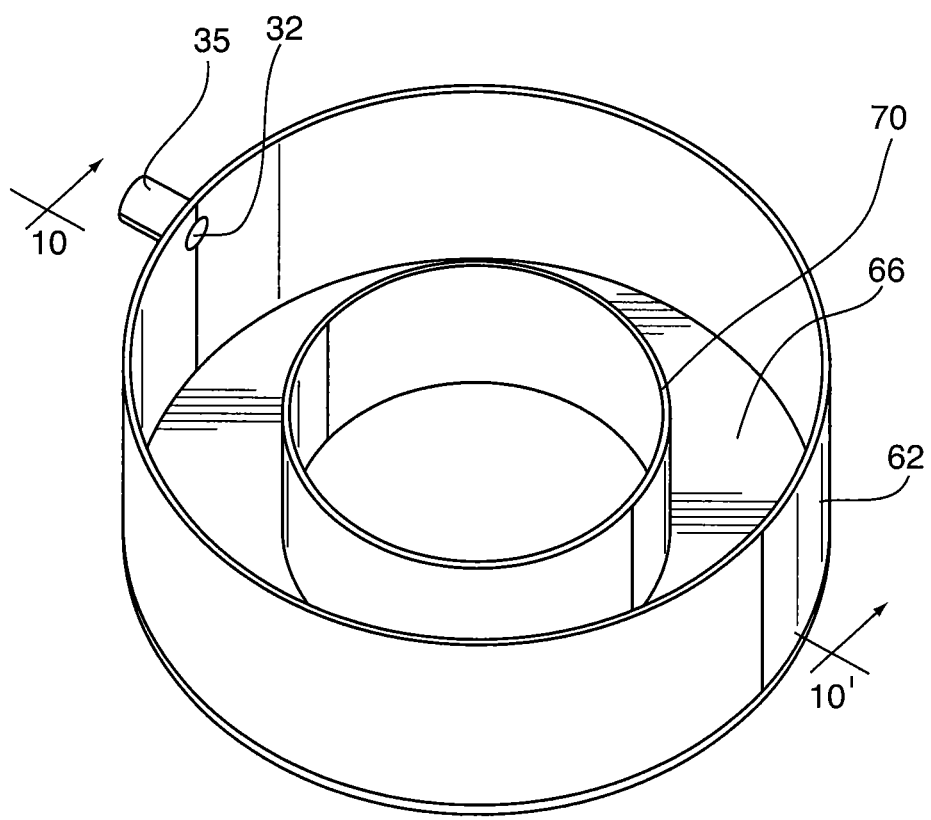
FIG. 9 is a perspective view of a lower portion of the outer shell thereof.
Figure 10:
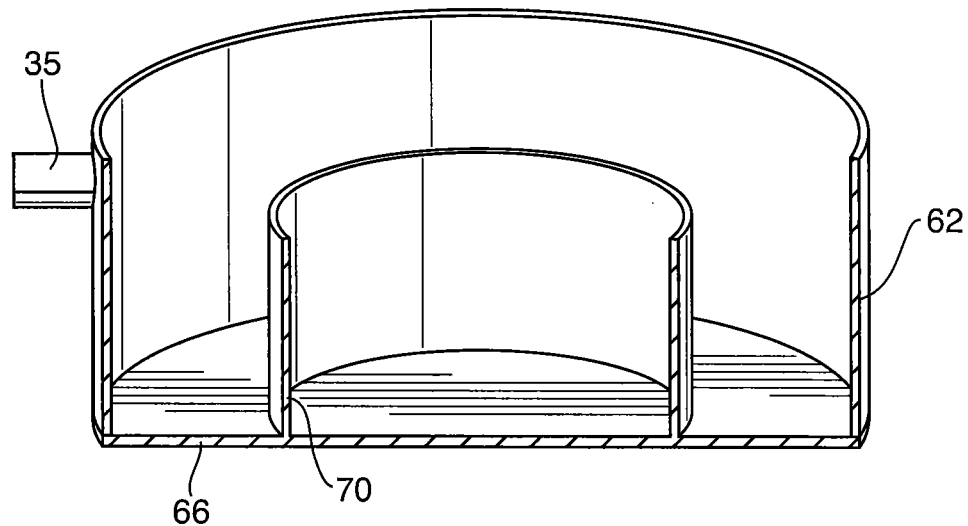
FIG. 10 is a cross-section along line 10-10' of FIG. 9'.
Figure 11:
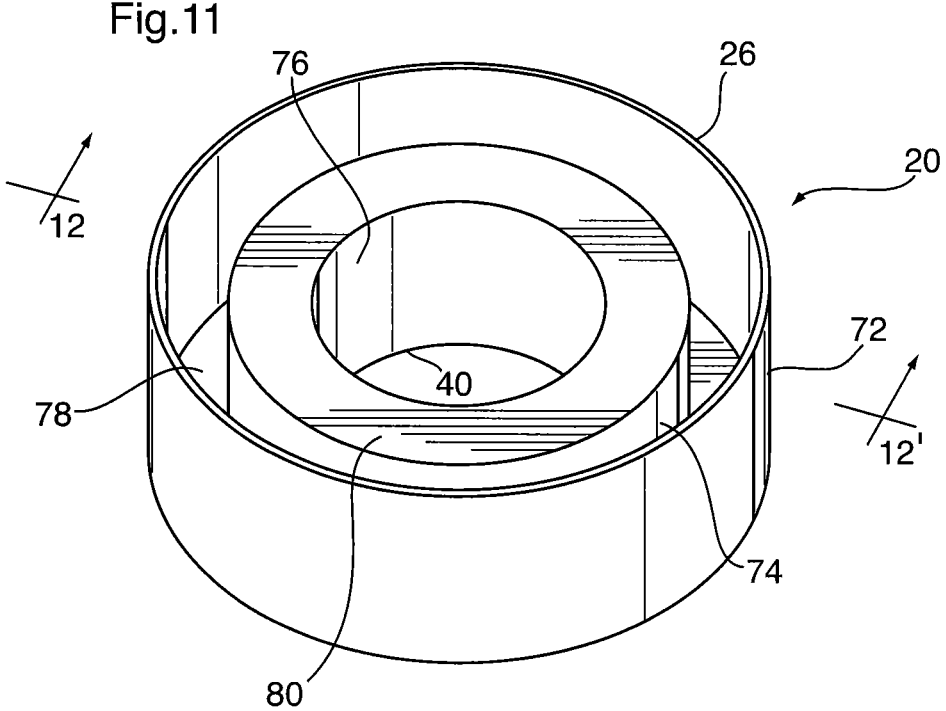
FIG. 11 is a perspective view of the separating wall thereof.
Figure 12:
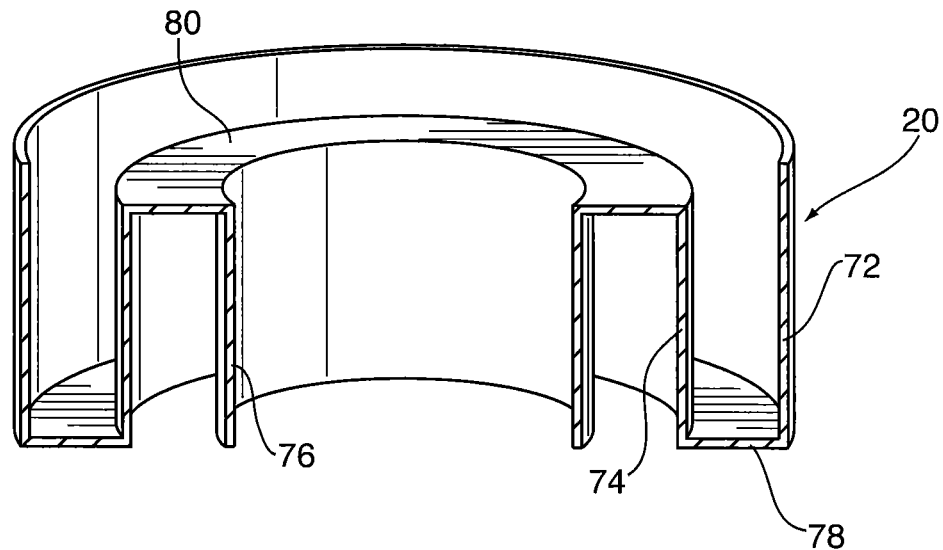
FIG. 12 is a cross-section along line 12-12' of FIG. 11.
Figure 13:
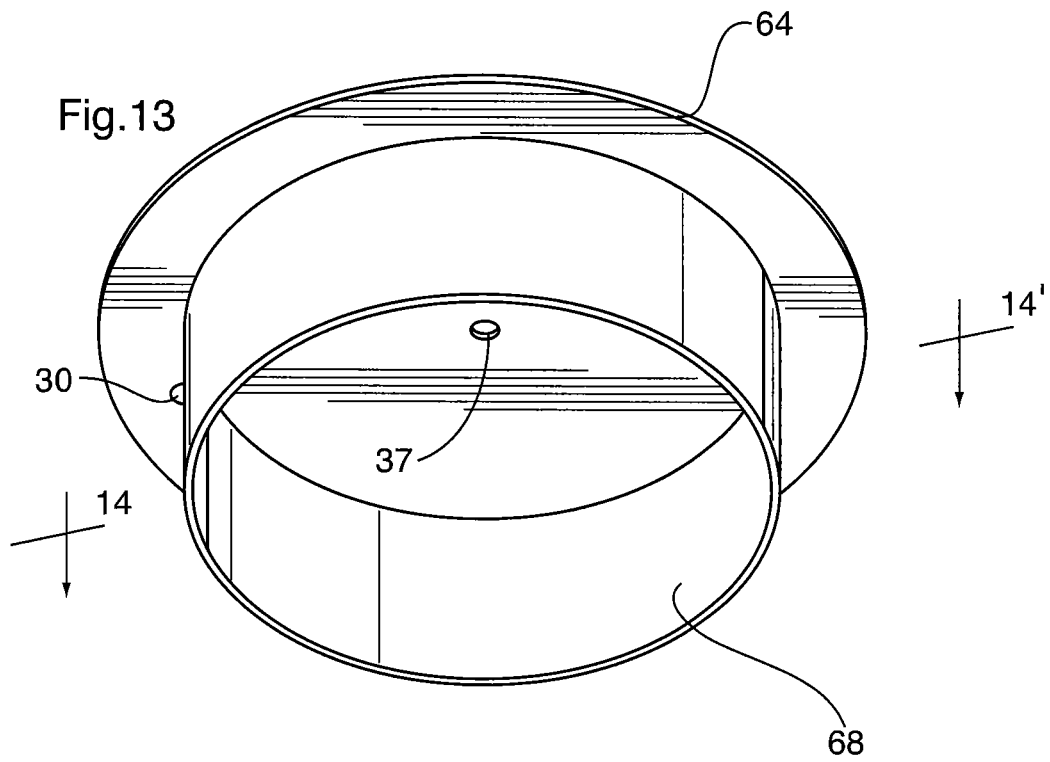
FIG. 13 is a perspective view of an upper portion of the outer shell thereof.
Figure 14:
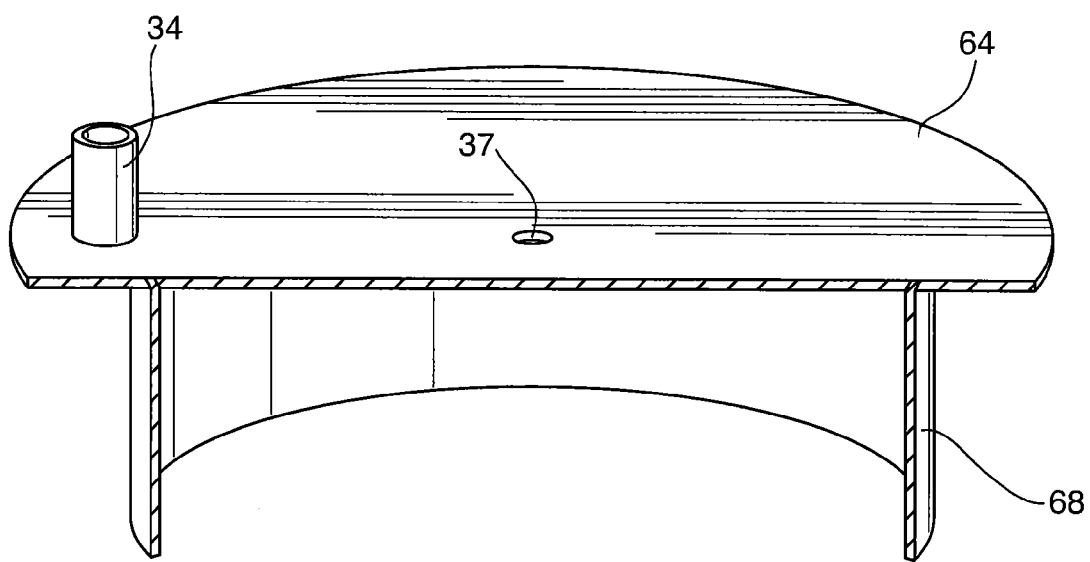
FIG. 14 is a cross-section along line 14-14' of FIG. 13'.

As best seen in FIGS. 7 and 8, there are four layers of gas permeable support structure in fuel processor 60, and these are identified by reference numerals 82, 84, 86 and 88, from the outside toward the inside of fuel processor 60.

A first layer of gas permeable support structure 82 is provided in an outer portion of the product gas passage 24, between the outer cylindrical wall 72 of separating wall 20 and the outer cylindrical side wall 62 of outer shell 12. As shown in FIG. 8, the layer 82 is in the form of a corrugated sheet which is wrapped around the outer cylindrical wall 72 of separating wall 20, with its inner ridges contacting the outer surface of the cylindrical wall 72 and its outer ridges contacting the inner surface of the outer wall 12. The inner ridges may be bonded to the outer surface of the outer cylindrical wall 72, for example by brazing or welding, while the outer ridges may be in contact with, but unbonded to, the inner surface of the outer wall 12. As shown in FIG. 7, the first layer of support structure 82 has a bottom which may be substantially coplanar with the outer annular wall 78 so as not to block a lower annular space 90 located between annular wall 78 and bottom wall 66 in which the product gas changes direction and flows outwardly toward the product gas port 32. The first layer of support structure 82 has a top which is located below the product gas port 32 so as not to block the product gas port 32 and to leave an annular outlet manifold space 92 in which circumferential flow of the product gas toward the product gas port 32 is unimpeded.

A second layer of gas permeable support structure 84 is provided in an outer portion of the reactant gas passage 22, between the first cylindrical baffle plate 68 and the outer cylindrical wall 72 of separating wall 20. As shown in FIG. 8, the layer 84 is in the form of a corrugated sheet which is wrapped around the first baffle plate 68, with its inner ridges contacting the outer surface of the first baffle plate 68 and its outer ridges contacting the inner surface of the outer cylindrical wall 72 of separating wall 20. The outer ridges may be bonded to the inner surface of the outer cylindrical wall 72 of separating wall 20, for example by brazing or welding, while the inner ridges may be in contact with, but unbonded to, the outer surface of the first baffle plate 68. As shown in FIG. 7, the second layer of support structure 84 has a bottom which may be substantially coplanar with the bottom of the first baffle plate 68 so as not to block a lower annular space 94 located between the bottom of first baffle plate 68 and the outer annular wall 78 in which the reactant gas changes direction and flows inwardly toward the catalyst bed 44. The second layer of support structure 84 has a top which may be substantially coplanar with the inner annular wall 80 of separating wall 20 so as to provide an annular inlet manifold space 96 in which the flow of reactant gas entering the fuel processor 60 through reactant gas port 30 is distributed circumferentially as it enters the reactant gas passage 22.

A third layer of gas permeable support structure 86 is provided in an inner portion of the reactant gas passage 22, between the first cylindrical baffle plate 68 and the middle cylindrical wall 74 of separating wall 20. As shown in FIG. 8, the layer 86 is in the form of a corrugated sheet which is wrapped around the middle cylindrical wall 74, with its inner ridges contacting the outer surface of the middle cylindrical wall 74 and its outer ridges contacting the inner surface of the first baffle plate 68. The inner ridges may be bonded to the outer surface of the middle cylindrical wall 74, for example by brazing or welding, while the outer ridges may be in contact with, but unbonded to, the inner surface of the first baffle plate 68. As shown in FIG. 7, the third layer of support structure 86 has a bottom which may be substantially coplanar with the bottom of the first baffle plate 68 so as not to block lower annular space 94. The third layer of support structure 86 also has a top which may be substantially coplanar with the inner annular wall 80 of separating wall 20, so as not to block a radial flow passage 98 between inner annular wall 80 and the top wall 64 of outer shell 12, thereby permitting inward radial flow of the product gas to the inlet space 42 adjacent to the catalyst bed 44.

A fourth layer of gas permeable support structure 88 is provided in an inner portion of the product gas passage 24, between the middle cylindrical wall 74 of separating wall 20 and the second cylindrical baffle plate 70. As shown in FIG. 8, the layer 88 comprises a corrugated sheet which is wrapped around the second baffle plate 70, with its inner ridges contacting the outer surface of the second baffle plate 70 and its outer ridges contacting the inner surface of the middle cylindrical wall 74. The outer ridges may be bonded to the inner surface of the middle cylindrical wall 74, for example by brazing or welding, while the inner ridges may be in contact with, but unbonded to, the outer surface of the second baffle plate 70. As shown in FIG. 7, the fourth layer of support structure 88 has a bottom which may be substantially coplanar with the outer annular wall 78 so as not to block the lower annular space 90 located between annular wall 78 and bottom wall 66 in which the product gas changes direction and flows outwardly toward the product gas port 32. The fourth layer of support structure 88 has a top which may be substantially coplanar with the top of the second baffle plate 70 so as not to block an upper annular space 100 located between the top of second baffle plate 70 and the inner annular wall 80 in which the product gas changes direction and flows outwardly toward the product gas port 32.

As can be seen from the drawings, the layers of support structure 82, 84, 86, 88 provide support for the separating wall relative to the outer shell 12 and the baffle plates 68, 70, thereby helping to maintain the concentric arrangement of the cylindrical walls making up the fuel processor 60. In addition, the bonding of the ridges of support structures 82, 84, 86, 88 only to the separating wall 20, while leaving them unbonded to the baffles 68, 70 and outer shell 12, permits fuel processor accommodate differential thermal expansion of walls 12 and 20, and thereby minimize thermal stresses within fuel processor 60. Furthermore, bonding of the support structures 82, 84, 86, 88 to the separating wall 20 enhances heat transfer between the product gas and reactant gas streams.

In the illustrated embodiment the first layer of gas permeable support structure 82 is in direct contact with the inner surface of the outer wall 12, however, this is not the case in all embodiments of the invention. In some embodiments a layer of heat resistant insulating material (not shown) is provided between the outer gas permeable support structure 52 and the inner surface of the outer wall 12 in order to prevent blow-by and to decrease heat transfer loss to the outside environment.

As shown in the drawings, the portion of the product gas passage 24 between the second cylindrical baffle plate 70 and the inner cylindrical wall 76 of separating wall 20 may be left without a layer of gas permeable support structure because the product gas flowing through this portion of passage 24 is at substantially the same temperature as catalyst bed 44, and is not in heat exchange contact with the product gas. The additional support provided to the catalyst bed 44 may not outweigh the added pressure drop caused by placing an additional layer of gas permeable support structure in this portion of product gas passage 24, and therefore this portion of passage 24 may be left empty.

Figure 15:
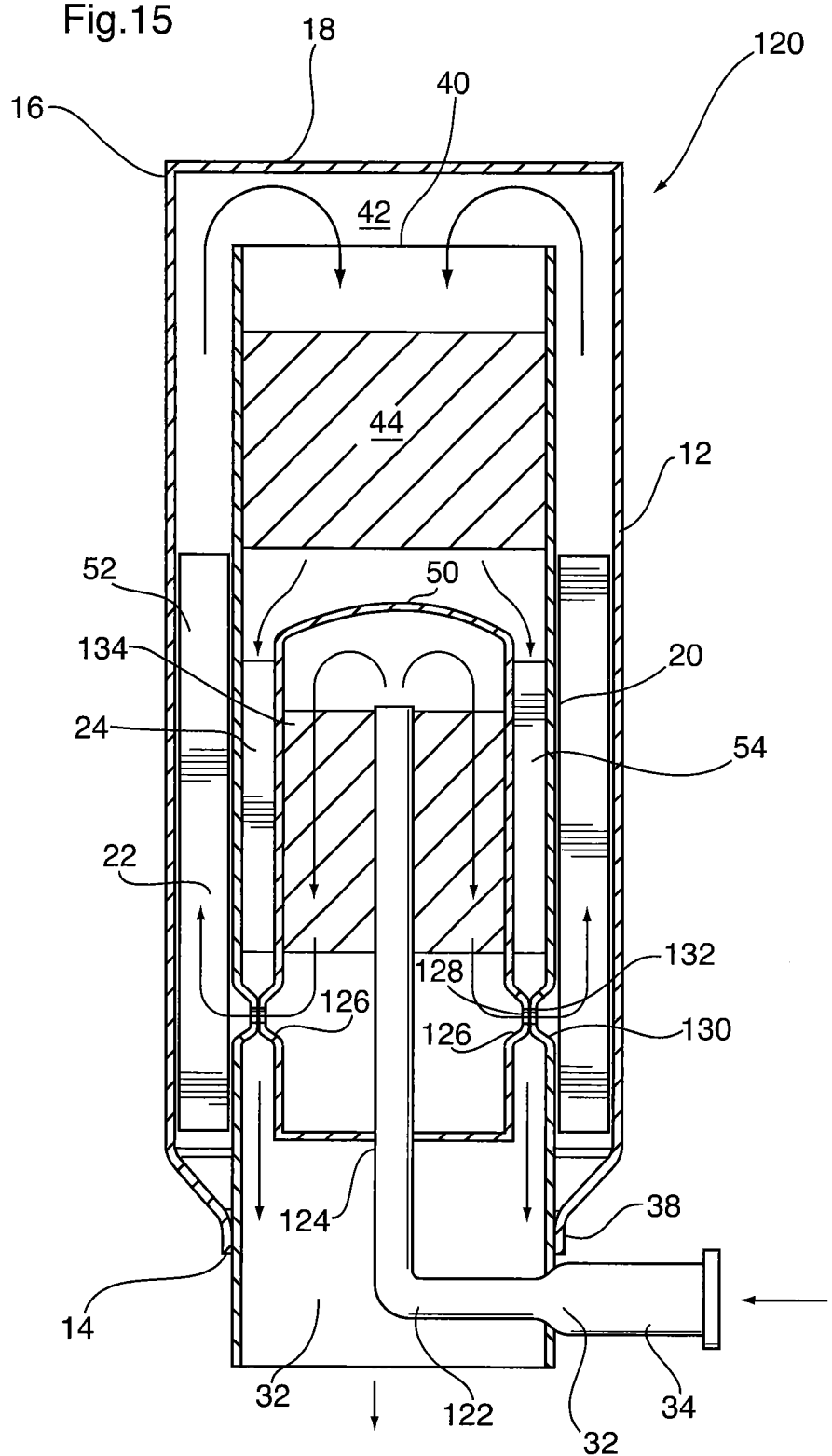
FIG. 15 is a longitudinal cross-section through a fuel processor according to a third embodiment of the invention.

FIG. 15 illustrates a fuel processor 120 having a slightly different configuration than fuel processor 10 described above. This embodiment shares many of the same elements as fuel processor 10, and these elements are identified in the following description and/or in FIG. 15 with like reference numerals, and the above description of these elements in fuel processor 10 applies equally to the present embodiment. Therefore, the following description is limited to the differences between fuel processor 10 and fuel processor 20.

Rather than introducing the reactant gas directly into the reactant gas passage 22, the reactant gas port 32 is provided with an inlet pipe 122 which delivers the reactant gas from port 32 to the inside of the third tube 50, wherein the inlet pipe 122 enters the third tube 50 through an aperture 124 which is provided in its closed bottom end. In the embodiment shown in the drawings, the inlet pipe 122 comprises an inward extension of reactant gas inlet fitting 34, although they may be separately formed if desired.

The third tube 50 is provided with a plurality of outwardly extending "bubbles" or dimples 126 spaced around its circumference, and the fuel processor 120 has four such dimples 126 in third tube 50, only two of which are visible in FIG. 15. The dimples 126 have apertures 128 to permit the reactant gas to exit the third tube 50. The dimples 126 of the third tube 50 are in contact with and sealingly connected to the separating wall 20. The separating wall is provided with apertures 132 which align with the apertures 128 of the third tube 50, thereby providing the reactant gas with a flow path from the interior of third tube 50 to the outer flow passage 18 in which heat is exchanged between the reactant gas and the product gas across the wall of third tube 50. In the illustrated embodiment, the separating wall 20 also has inwardly extending bubbles or dimples 130 in which apertures 132 are formed. The dimples 126, 130 contact one another in the space 24 between the separating wall 20 and the third tube 50. In the alternative, dimples 126 of third tube 50 may extend outwardly by a sufficient distance to contact the cylindrical wall of separating wall 20, in which case the dimples 130 of separating wall 20 are not required. As a further alternative, it is possible that the dimples 130 of the separating wall 20 extend inwardly by a sufficient distance to contact the cylindrical wall of third tube 50, in which case the dimples 126 of third tube 50 are not required.

A layer of turbulizer of fin 134 may be provided in the annular space between the third tube 50 and the inlet pipe 122 to as to improve heat exchange between the reactant gas and the product gas. The layer or turbulizer or fin 134 may be of identical construction as support structure layers 52, 54 described above and is oriented in the low pressure drop configuration. The layer of turbulizer or fin 134 may have its outer ridges bonded to the inner surface of the third tube 50, and with it inner ridges left unbonded to the inlet pipe 122.

Once the reactant gas enters the reactant gas passage 22, the construction and operation of the fuel processor 120 are substantially the same as fuel processor 10 described above.

The fuel reformers of the invention are made of a sheet metal having a sufficiently high melting point, elevated temperature strength, and oxidation resistance in order to achieve the necessary durability. Typical materials that can be used to construct this reformer include austenitic or ferritic stainless steel, Inconel™, and other nickel or alloy steel materials. The gauge of the sheet metal will depend on the design of the particular reformer system but can typically range from 0.5 mm to 4 mm for low to moderate life requirements, or the gauge can be doubled over this range for large or extended life applications (for example, stationary power). The size of the fuel reformer of this invention can vary depending upon its intended use, it being understood that it is generally desirable to reduce the weight and space requirements of the reformer while maintaining the desired durablility.

Although the invention has been described in relation to certain embodiments thereof, it is not limited thereto. Rather, the invention includes all embodiments which may fall within the scope of the following claims.

What is claimed is:

1. A fuel processor, comprising:
   (a) a reactant gas passage;
   (b) a product gas passage;
   (c) a separating wall which separates the reactant gas passage from the product gas passage, the separating wall having a fixed end and a free end, wherein the fixed end is proximate to a reactant gas port and a product gas port;
   (d) a catalyst received inside the separating wall proximate to the free end thereof, wherein the reactant gas passage extends from the reactant gas port to the catalyst and the product gas passage extends from the catalyst to the product gas port;
   (e) an outer wall which surrounds the separating wall throughout at least a portion of its length; and
   (f) a first layer of gas permeable support structure provided between, and in contact with, the separating wall and the outer wall, wherein the first layer of gas permeable support structure is located between the fixed end and the free end of the separating wall;
   wherein the separating wall extends continuously from the fixed end thereof to the catalyst and wherein the product gas passage is in heat exchange contact with the reactant gas passage between the fixed end and the free end of the separating wall;
   wherein the separating wall and the outer wall each comprise cylindrical walls extending parallel to a gas flow axis and arranged concentrically with one another, such that at least a portion of one of the reactant gas passage and the product gas passage is located in an annular space between the separating wall and the outer wall; and
   wherein the annular space between the separating wall and the outer wall comprises the reactant gas passage.

2. The fuel processor of claim 1, wherein the fixed end of the separating wall is joined to the outer wall.

3. The fuel processor of claim 1, wherein the outer wall comprises a housing having an end wall, wherein the end wall is spaced from the free end of the separating wall so as to form an inlet space at which the reactant gas enters the catalyst.

4. The fuel processor of claim 1, wherein the reactant gas port is located in the outer wall.

5. The fuel processor of claim 1, wherein the first layer of gas permeable support structure is located in said annular space and surrounds the separating wall along at least a portion of its length.

6. The fuel processor of claim 5, wherein the first layer of gas permeable support structure is a corrugated fin or a turbulizer.

7. The fuel processor of claim 1, wherein a third cylindrical tube is located inside the separating wall, wherein the third cylindrical tube has at least one closed end, and wherein the third cylindrical tube is parallel to the gas flow axis such that an inner annular space is provided between the third tube and the separating wall.

8. The fuel processor of claim 7, wherein a second layer of gas permeable support structure is provided in the inner annular space, and surrounds the third tube along at least a portion of its length, and wherein the second layer of gas permeable support structure in the inner annular space is a corrugated fin or turbulizer.

9. The fuel processor of claim 7, wherein the third cylindrical tube has a first closed end proximate to the catalyst and a second end with a hole proximate to the fixed end of the separating wall, wherein the fuel processor further comprises an inlet tube extending from the reactant gas port which is formed in the outer wall, to a hollow interior of the third tube through said hole; and wherein at least one of the separating wall and the third cylindrical tube are provided with radially extending dimples along which the separating wall and the third tube are joined together, and wherein apertures are provided in portions of the separating wall and the third cylindrical tube which are joined together by said dimples, such that a hollow interior of the third tube is in flow communication with the reactant gas passage located between the separating wall and the outer wall.

10. A fuel processor, comprising:
(a) a reactant gas passage;
(b) a product gas passage;
(c) a separating wall which separates the reactant gas passage from the product gas passage, the separating wall having a fixed end and a free end, wherein the fixed end is proximate to a reactant gas port and a product gas port;
(d) a catalyst received inside the separating wall proximate to the free end thereof, wherein the reactant gas passage extends from the reactant gas port to the catalyst and the product gas passage extends from the catalyst to the product gas port;
(e) an outer wall which surrounds the separating wall throughout at least a portion of its length; and
(f) a first layer of gas permeable support structure provided between, and in contact with, the separating wall and the outer wall, wherein the first layer of gas permeable support structure is located between the fixed end and the free end of the separating wall;

wherein the separating wall extends continuously from the fixed end thereof to the catalyst and wherein the product gas passage is in heat exchange contact with the reactant gas passage between the fixed end and the free end of the separating wall;

wherein the reactant gas passage and the product gas passage are oriented substantially parallel to a gas flow axis, and wherein each of the reactant gas passage and the product gas passage undergoes at least one change in direction of about 180 degrees along its length; and wherein each of the reactant gas passage and the product gas passage undergoes at least two of said changes in direction along its length.

11. The fuel processor of claim 10,
wherein the outer wall comprises a housing having an end wall, wherein the end wall is spaced from the free end of the separating wall so as to form an inlet space at which the reactant gas enters the catalyst, and wherein one of said changes in direction in the reactant gas passage is located in said inlet space.

12. The fuel processor of claim 10, wherein the separating wall has a serpentine shape and is completely enclosed by the outer wall.

13. The fuel processor of claim 12, wherein the separating wall comprises at least an outer cylindrical wall, a middle cylindrical wall and an inner cylindrical wall which are radially spaced apart from one another, wherein a bottom of the outer cylindrical wall is joined to a bottom of the middle cylindrical wall through an outer annular wall, and wherein a top of the middle cylindrical wall is joined to a top of the inner cylindrical wall through an inner annular wall.

14. The fuel processor of claim 12, wherein the fixed end of the separating wall is proximate to a top of the outer cylindrical wall and the free end of the separating wall is provided at a bottom of the inner cylindrical wall distal from the inner annular wall, and wherein the catalyst is received inside the inner cylindrical wall; and wherein the fixed end is secured to a top wall of the outer wall by a rigid connection.

15. The fuel processor of claim 14, wherein a first cylindrical baffle extends downwardly from the top wall into an annular space between the outer cylindrical wall and the middle cylindrical wall of the separating wall, so as to provide a U-shaped passage for flow of the reactant gas;

wherein the outer wall further comprises a bottom wall opposite to the top wall, and wherein a second cylindrical baffle extends upwardly from the bottom wall into an annular space between the middle cylindrical wall and the inner cylindrical wall of the separating wall, so as to provide a U-shaped passage for flow of the product gas; and wherein the first layer of gas permeable support structure is located between the outer cylindrical wall of the separating wall and the outer wall, and wherein the fuel processor further comprises a second layer of gas permeable support structure between the outer cylindrical wall and the first baffle, a third layer of gas permeable support structure between the first baffle and the middle cylindrical wall of the separating wall, and a fourth layer of gas permeable support structure between the middle cylindrical wall of the separating wall and the second baffle.

16. A fuel processor, comprising:
(a) a reactant gas passage;
(b) a product gas passage;
(c) a separating wall which separates the reactant gas passage from the product gas passage, the separating wall having a fixed end and a free end, wherein the fixed end is proximate to a reactant gas port and a product gas port;
(d) a catalyst received inside the separating wall proximate to the free end thereof, wherein the reactant gas passage extends from the reactant gas port to the catalyst and the product gas passage extends from the catalyst to the product as port;

(e) an outer wall which surrounds the separating wall throughout at least a portion of its length; and (f) a first layer of gas permeable support structure provided between, and in contact with, the separating wall and the outer wall, wherein the first layer of gas permeable support structure is located between the fixed end and the free end of the separating wall;

wherein the separating wall extends continuously from the fixed end thereof to the catalyst and wherein the product gas passage is in heat exchange contact with the reactant gas passage between the fixed end and the free end of the separating wall; and wherein the catalyst is contained in a cylindrical catalyst container, and wherein the catalyst container is frictionally retained within the separating wall; and wherein a layer of compressible material is provided between the catalyst container and the separating wall.

* * * * *